3,565,576
PROCESS FOR PURIFYING HEXACHLOROIRIDIC ACID
Guy Pannetier, Sceaux, France, assignor to Centre National d'Etudes Spatiales, Paris, France, a company of France
No Drawing. Filed Dec. 22, 1969, Ser. No. 887,330
Claims priority, application France, Dec. 23, 1968, 180,118
Int. Cl. C01g 55/00
U.S. Cl. 23—22                    1 Claim

ABSTRACT OF THE DISCLOSURE

A process for removing sodium chloride contained in commercial hexachloroiridic acid, which comprises a heat treatment of the impure acid with nitric acid, a precipitation of a complex hydroxide of tetravalent iridium by adding ammonium hydroxide in the presence of hydrogen peroxide and a heat treatment of the washed precipitate with hydrochloric acid in order to obtain substantially pure hexachloroiridic acid.

---

The present invention relates to a process for purifying hexachloroiridic acid and to the purified product obtained by said process.

Hexachloroiridic acid is a compound which is used as starting material for the preparation of catalysts containing iridium as active material. It is desirable for such application to use hexachloroiridic acid as pure as possible.

However, commercially available hexachloroiridic acid is an impure product of unprecise composition which contains, in particular, from 8 to 10%, by weight, of sodium chloride.

The invention has for object a purification process which permits, in particular, to remove substantially all the sodium chloride contained in the hexachloroiridic acid.

According to the invention, this process comprises dissolving in water the sodium chloride-containing-hexachloroiridic acid; treating at boiling the resultant solution by an excess of nitric acid; continuing the boiling substantially up to dryness for removing the excess of nitric acid; dissolving the resultant residue in water; adding an effective small amount of hydrogen peroxide for maintaining oxidizing conditions; treating at boiling the resultant solution with ammonium hydroxide for precipitating a complex hydroxide of tetravalent iridium; separating the resultant precipitate; washing said precipitate with water for removing sodium chloride remaining in this precipitate; hot treating said washed precipitate with hydrochloric acid for obtaining hexachloroiridic acid substantially free from sodium chloride.

The step of treatment with nitric acid converts the hexachloroiridic acid into iridium (IV) nitrate and avoids the reduction of iridium due to its oxidizing properties.

The step of adding hydrogen peroxide avoids the reduction of iridium (IV) into iridium (III) and, thus, to precipitate subsequently an homogeneous product. The use of hydrogen peroxide is preferred to that of other oxidants because hydrogen peroxide does not introduce any impurity which cannot be removed by boiling.

The exact nature of the precipitated complex hydroxide of iridium (IV) has not yet been determined. It is deemed, however, that this compound is a complex hydroxide containing nitrogen, probably an ammined hydroxide. The important point is that this complex hydroxide obtained from iridium (IV) nitrate does not include sodium chloride during its precipitation in contrast with the simple iridium hydroxide obtained from iridic acid.

The following example is given in order to further illustrate the process of the invention.

EXAMPLE

In about 100 ml. of water are dissolved 25 g. of hexachloroiridic acid containing 8–10%, by weight, of sodium chloride as impurity; said solution is filtered, then treated at boiling with an excess (about 100 ml.) of nitric acid (analysis grade). The boiling is continued almost to dryness in order to remove the excess of nitric acid. The resultant residue is dissolved in water (about 100 ml.). A small amount of diluted hydrogen peroxide (at 30 volumes) is added to the resultant solution for providing oxidizing conditions and, thus, retaining the iridium at the valence 4, then a complex hydroxide of iridium (IV) is precipitated by adding, at boiling, ammonium hydroxide.

The precipitation does not proceed very well, a portion of the complex iridium hydroxide being in the form of very small particles. After settling or centrifugation, the solution is kept for the purpose of recovering the complex iridium hydroxide which is in the form of very small particles (this can be achieved, for example, by filtering said solution on a microporous filter having pores of one micron). The settled or centrifugated precipitate to which the very finely divided precipitate recovered by filtration can be added, is then added to distilled water and boiled in order to wash it. This washing step is repeated three times. At the third washing, substantially all the sodium chloride is considered as removed.

The titration of sodium is effected by atomic absorption. After the precipitation of the complex iridium hydroxide, about 0.15%, by weight, of sodium chloride remains. After the three washings, it remains only 0.05% of sodium chloride.

The washed complex iridium (IV) hydroxide is, then, charged into hydrochloric acid (about 100 ml.) about at boiling. The excess of hydrochloric acid is evaporated at 70° C. on a sand bath. The resultant hexachloroiridic acid contains from 48 to 55% of iridium and is free from sodium chloride.

As it will be obvious, the embodiment specifically described is only an example and it is possible to modify it by using technical equivalents.

I claim:
1. A process for purifying hexachloroiridic acid containing sodium chloride as impurity, which comprises dissolving in water the sodium chloride-containing-hexachloroiridic acid; treating the resultant solution with an excess of nitric acid at boiling temperature continuing the boiling substantially to dryness to remove the excess of nitric acid; dissolving the resultant residue in water; adding an amount of hydrogen peroxide sufficient to maintain oxidizing conditions; treating the resultant solution with ammonium hydroxide at boiling temperature to precipitate a complex hydroxide of tetravalent iridium; separating the resultant precipitate; washing said precipitate with water to remove sodium chloride remaining in the precipitate; heating said washed precipitate in the presence of hydrochloric acid to produce hexachloroiridic acid substantially free from sodium chloride.

References Cited

Gmelins Handbuch Der Anorganischen Chemie, 8th edition, System-Number 67 (Iridium), 1939, pp. 65–67.

Mellor, "Textbook of Inorganic & Theoretical Chemistry," vol. 15, Longmans, Green & Co., N.Y., 1939, p. 768.

HERBERT T. CARTER, Primary Examiner

U.S. Cl. X.R.

23—23, 24, 139